United States Patent
Morenko et al.

(10) Patent No.: US 11,933,187 B2
(45) Date of Patent: Mar. 19, 2024

(54) BEARING HOUSING ASSEMBLY

(71) Applicant: PRATT & WHITNEY CANADA CORP., Longueuil (CA)

(72) Inventors: Oleg Morenko, Oakville (CA); Sandeep Vishal Dhalla, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 488 days.

(21) Appl. No.: 17/126,678

(22) Filed: Dec. 18, 2020

(65) Prior Publication Data

US 2022/0195888 A1 Jun. 23, 2022

(51) Int. Cl.
*F01D 25/12* (2006.01)
*F01D 25/16* (2006.01)

(52) U.S. Cl.
CPC ........... *F01D 25/125* (2013.01); *F01D 25/16* (2013.01); *F05D 2240/50* (2013.01); *F16C 2360/23* (2013.01)

(58) Field of Classification Search
CPC .... F01D 25/125; F01D 25/16; F05D 2240/50; F16C 2360/23
See application file for complete search history.

(56) References Cited

U.S. PATENT DOCUMENTS

| | | | | |
|---|---|---|---|---|
| 3,166,237 A | * | 1/1965 | Hill | F02C 7/18 417/409 |
| 4,248,566 A | * | 2/1981 | Chapman | F04D 27/0215 415/26 |
| 5,415,478 A | * | 5/1995 | Matthews | F01D 25/125 384/277 |
| 8,147,178 B2 | * | 4/2012 | Ottaviano | F02C 3/08 415/104 |
| 10,767,560 B2 | * | 9/2020 | Rogers | F01D 25/18 |
| 2005/0235651 A1 | * | 10/2005 | Morris | F01D 25/125 60/39.08 |
| 2006/0123795 A1 | * | 6/2006 | Fish | F01D 25/183 60/39.08 |
| 2008/0080969 A1 | * | 4/2008 | Legare | F01D 5/088 415/170.1 |
| 2010/0239418 A1 | * | 9/2010 | Schott | F02C 3/14 415/207 |
| 2016/0160668 A1 | * | 6/2016 | Eastwood | F01D 9/04 29/889.22 |
| 2017/0314468 A1 | * | 11/2017 | Wotzak | F01D 25/183 |

FOREIGN PATENT DOCUMENTS

| | | |
|---|---|---|
| DE | 19652754 | 6/1998 |
| FR | 2115143 | 7/1972 |

* cited by examiner

*Primary Examiner* — David E Sosnowski
*Assistant Examiner* — Aye S Htay
(74) *Attorney, Agent, or Firm* — NORTON ROSE FULBRIGHT CANADA LLP

(57) ABSTRACT

A bearing housing cover for a gas turbine engine having an impeller. The bearing housing comprises an annular collar having a flange mountable to an exterior surface of a bearing housing. The bearing housing further comprises an impeller baffle integrated with the annular collar, the impeller baffle having an annular body with a front baffle face positionable adjacent a rear face of the impeller, a rear baffle face having a plurality of stiffening elements extending between the rear baffle face and the annular collar, and a central baffle opening.

20 Claims, 6 Drawing Sheets

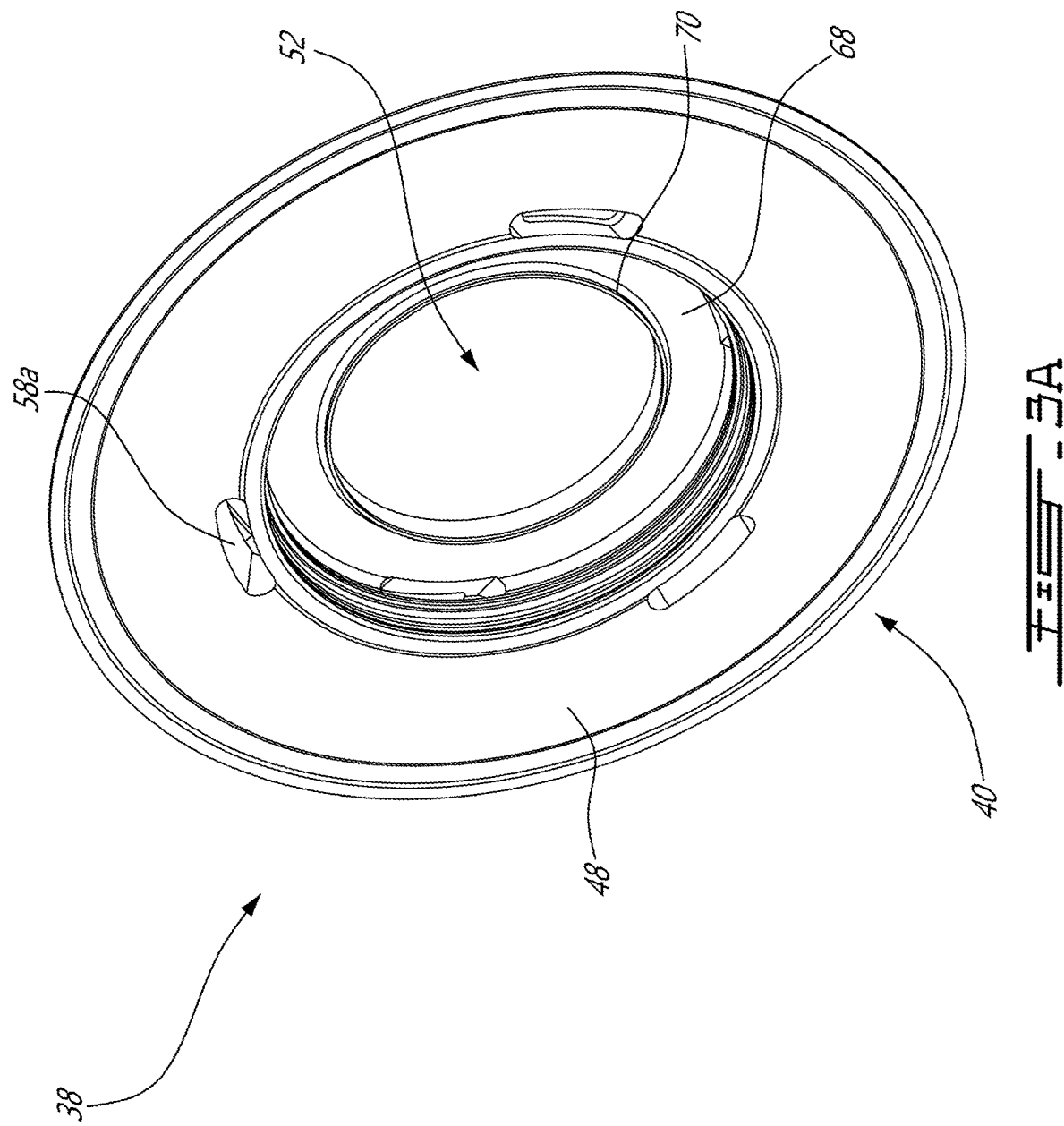

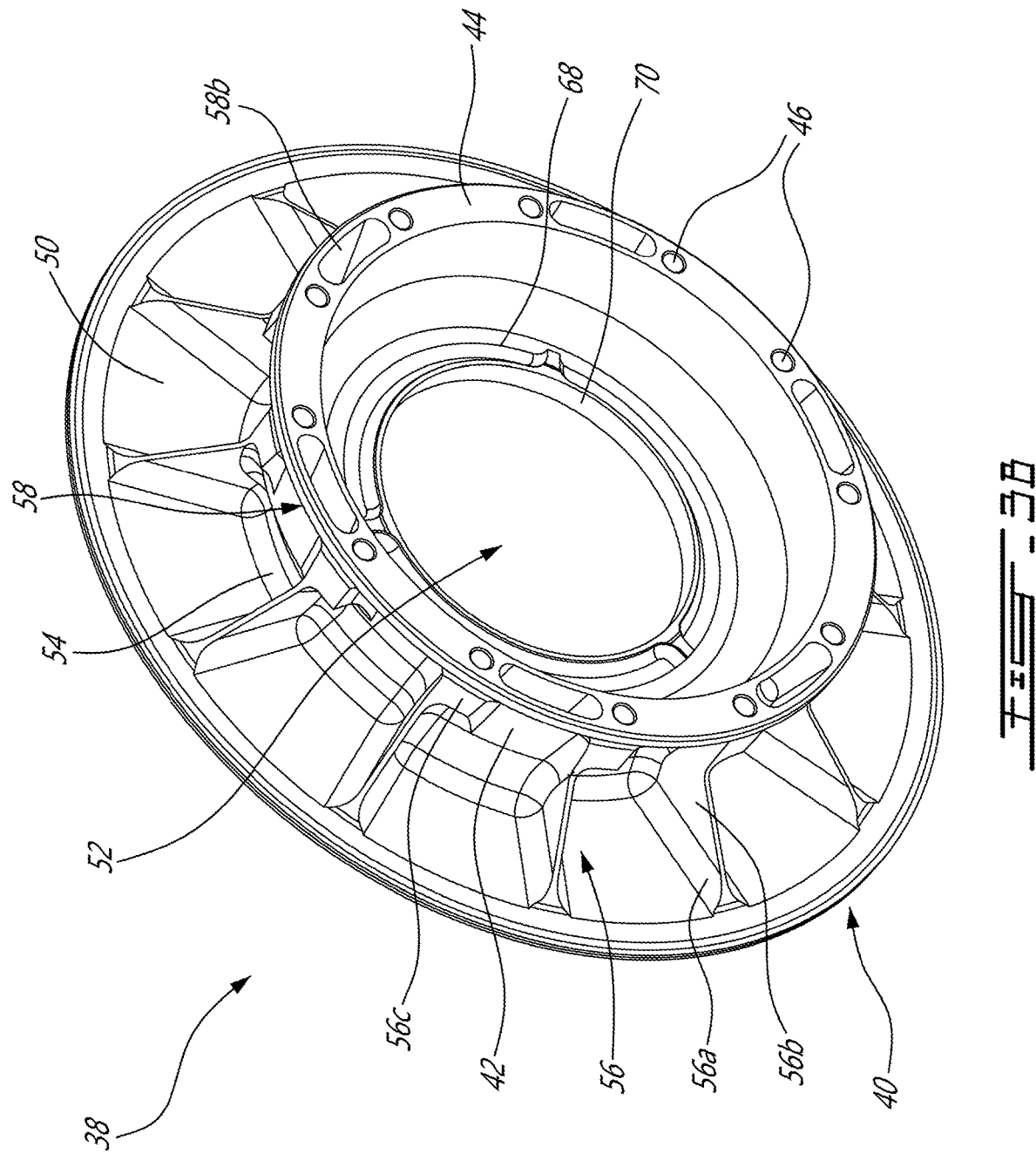

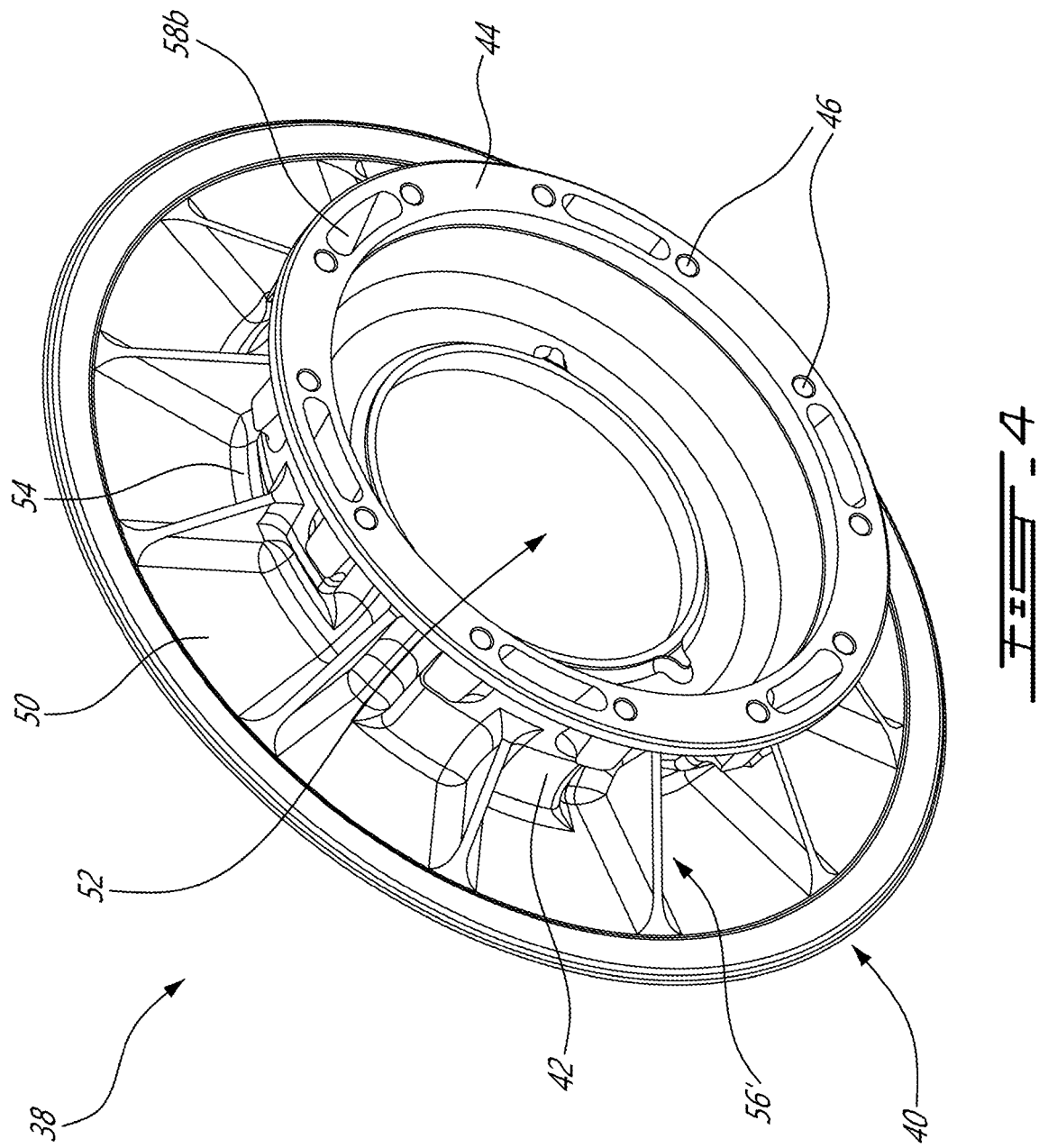

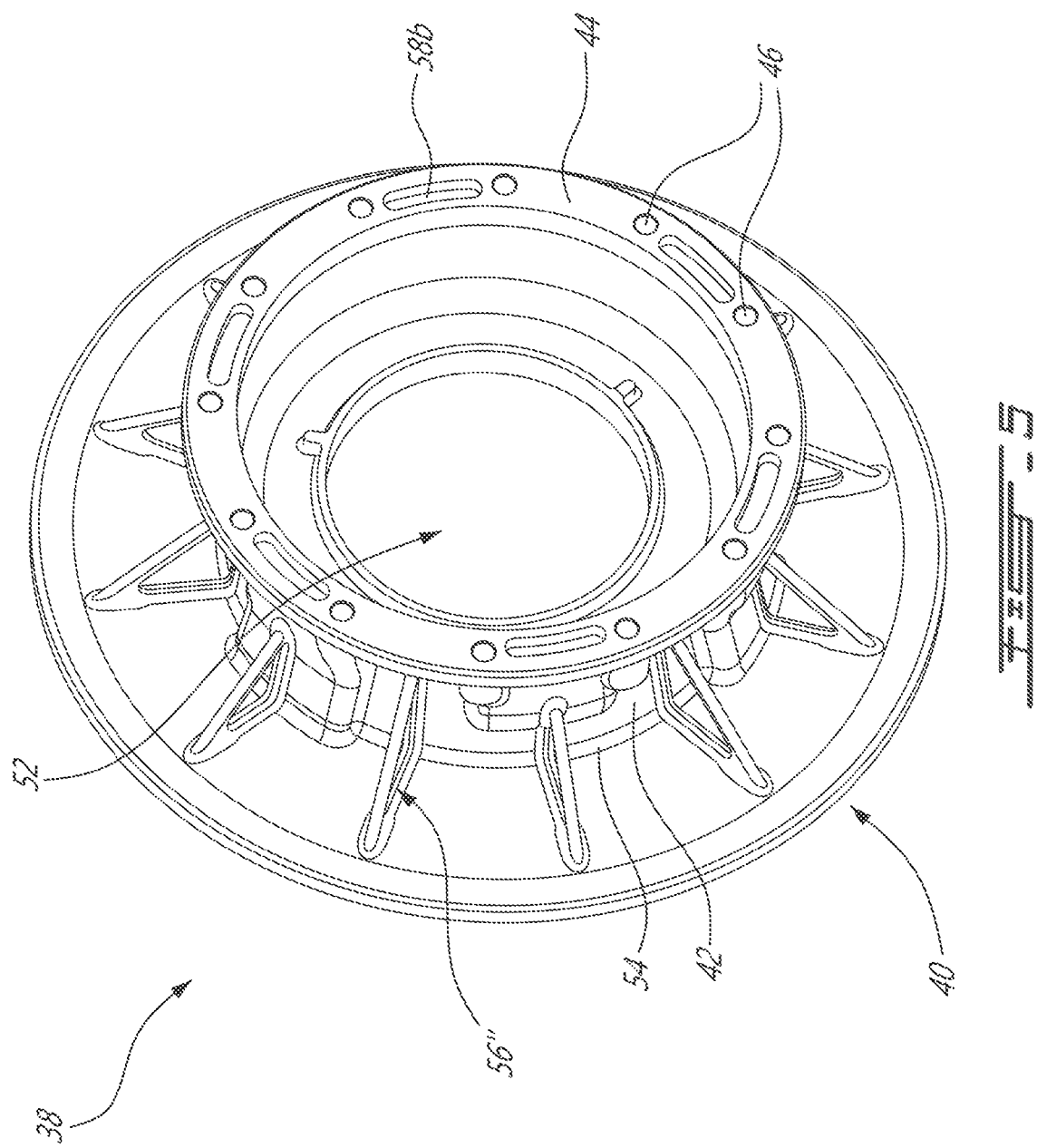

BEARING HOUSING ASSEMBLY

TECHNICAL FIELD

The disclosure relates generally to gas turbine engines and, more particularly, to gas turbine engines having a centrifugal compressor with an impeller.

BACKGROUND

Centrifugal compressors in a gas turbine engine include an impeller and a diffuser downstream from the impeller. At the compressor exit, the compressed air may be used, in addition to providing compressor air to the engine core for combustion, to pressurize an engine air system as well as pressurize nearby air-oil interfaces such as those sealing bearing cavities.

Typically, an impeller baffle is disposed downstream of a rear face of the impeller, to limit losses and restrict air which may otherwise escape around the rear face of the impeller. Such impeller baffles are typically add-on parts that require some form of attachment to a mating part. These add-on baffles may be complicated to assemble, afford minimal dynamic tuning options, and their attachment means may loosen or require service over time.

SUMMARY

In one aspect, there is provided a bearing housing cover for a gas turbine engine having an impeller, comprising: an annular collar having a flange mountable to an exterior surface of a bearing housing; and an impeller baffle integrated with the annular collar, the impeller baffle having an annular body with a front baffle face positionable adjacent a rear face of the impeller, a rear baffle face having a plurality of stiffening elements extending between the rear baffle face and the annular collar, and a central baffle opening.

In another aspect, there is provided a gas turbine engine comprising: a centrifugal compressor having an impeller; a bearing housing located downstream from the impeller, the bearing housing including a bearing within an interior chamber, the bearing rotationally supporting the impeller; and a bearing housing cover at least partially enclosing the bearing housing, the bearing housing comprising: an annular collar having a flange mountable to an exterior surface of the bearing housing; an impeller baffle integrated with the annular collar, the impeller baffle having an annular body with a front baffle face positioned adjacent a rear face of the impeller, a rear baffle face having a plurality of stiffening elements extending between the rear baffle face and the annular collar, and a central baffle opening; and a plurality of air passages extending at least partially axially between the front baffle face and the flange, the plurality of air passages in fluid communication with the interior chamber of the bearing housing.

In another aspect, there is provided a method of manufacturing a bearing housing cover for a gas turbine engine, comprising forming the bearing housing cover with an integrated impeller baffle from a single piece of material.

BRIEF DESCRIPTION OF THE DRAWINGS

Reference is now made to the accompanying figures in which:

FIGS. 3A and 3B are respective front and rear perspective views of the impeller baffle in accordance with an embodiment of the present disclosure;

FIG. 4 is a rear perspective view of an impeller baffle in accordance with another embodiment of the present disclosure; and FIG. 5 is a rear perspective view of an impeller baffle in accordance with another embodiment of the present disclosure.

DETAILED DESCRIPTION

Figure 1:
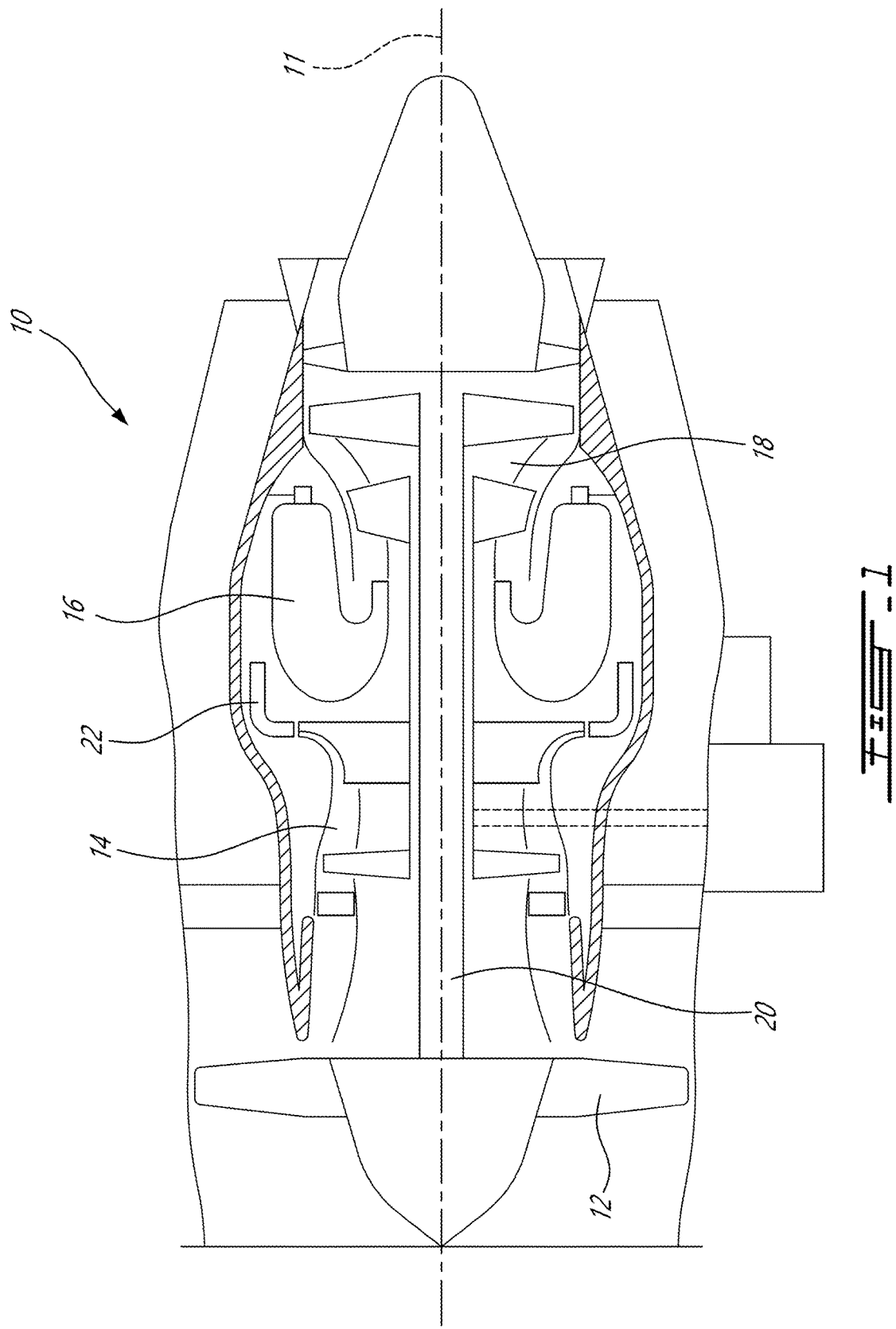
FIG. 1 is a schematic cross sectional view of a gas turbine engine.

FIG. 1 illustrates an exemplary gas turbine engine 10 of a type preferably provided for use in subsonic flight, generally comprising in serial flow communication a fan 12 through which ambient air is propelled, a centrifugal compressor 14 for pressurizing the air, a combustor 16 in which the compressed air is mixed with fuel and ignited for generating an annular stream of hot combustion gases, and a turbine 18 for extracting energy from the combustion gases. A main engine shaft 20 along longitudinal axis 11 interconnects the fan 12, the centrifugal compressor 14 and the turbine 18. In use, pressurized air provided by the centrifugal compressor 14 through a diffuser 22 enters the combustor 16 for combustion. While FIG. 1 shows gas turbine engine 10 to be a turbofan gas turbine engine, it is understood that the present disclosure is applicable to other types of gas turbine engines as well.

Figure 2:
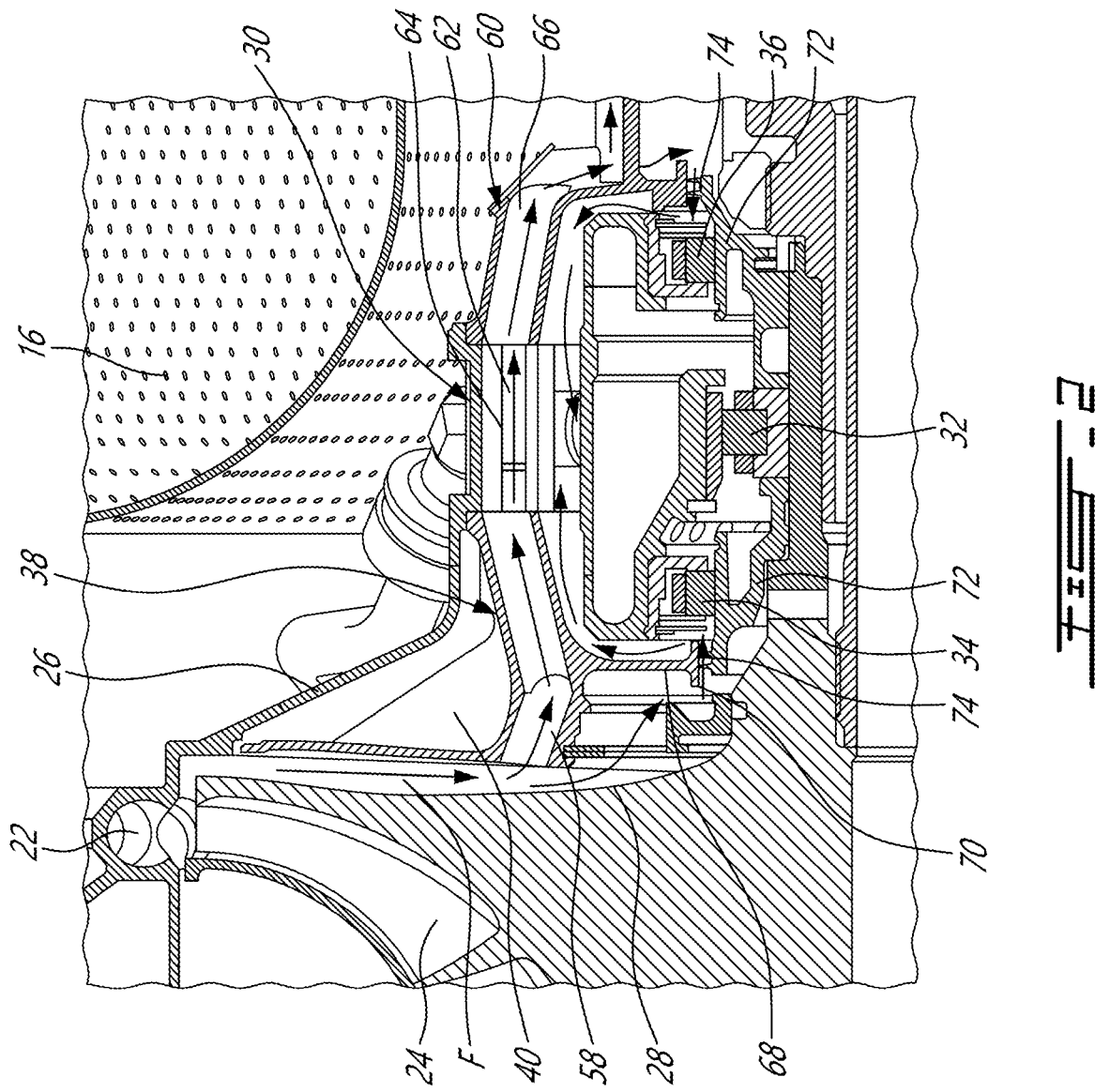
FIG. 2 is an enhanced cross sectional view of a bearing housing and surrounding structure including an impeller baffle in accordance with an embodiment of the present disclosure.

FIG. 2 shows an enhanced view of the engine 10 proximate the combustor 16 and diffuser 22. A centrifugal compressor 14 as in FIG. 1, which may include multiple axial stage rotors, is followed by an impeller 24 and a coverplate 26. The centrifugal compressor 14 supplies pressurized air to the combustor 16, the hot gases from which drive a turbine 18 as in FIG. 1. The impeller 24 has a rear face 28 behind which the air swirls at high velocity due to the rotation of the impeller 24. This swirling, high-velocity air tends to lower the pressure of the "rear face air", i.e. the airflow F immediately behind (i.e. downstream of) the impeller rear face 28.

As further shown in FIG. 2, a bearing housing 30, located downstream from the impeller 24, houses a bearing 32 which rotationally supports the main engine shaft 20, upon which the centrifugal compressor 14 and turbine 18 are mounted for example. The bearing 32, housed within an interior chamber of the bearing housing 30, is lubricated and cooled with oil circulated by a lubrication system within the gas turbine engine 10. A front carbon seal 34 as well as a rear carbon seal 36 are mounted to the bearing housing 30 to ensure that oil is sealed within the bearing housing 30. The front carbon seal 34, which may be a controlled-gap seal, is pressurized to prevent oil from leaking out of the bearing housing 30. Other seals may be contemplated as well.

Referring additionally to FIGS. 3A and 3B, a bearing housing cover 38 mountable to the bearing housing 30 includes an integrated impeller baffle 40. By "integrated", it is understood that the impeller baffle 40 is machined or otherwise formed as a single, unitary or monolithic, piece with the bearing housing cover 38. The bearing housing cover 38 includes an annular collar 42 having a flange 44 mountable to an exterior surface of the bearing housing 30. When mounted, the cover 38 at least partially encloses the bearing housing 30 and aids in sealing oil within the bearing housing 30. In the shown embodiment, although not necessarily the case in all embodiments, the flange 44 includes a plurality of holes 46 arranged in a bolt pattern for mounting to the bearing housing 30, illustratively twelve holes 46 about the perimeter of the flange 44. The width of the flange 44 may vary, for instance based on the structural requirements of the cover 38 or the sizing of the exterior surface of the bearing housing 30. The mounting or fastening of the bearing housing cover 38 to the bearing housing 30 will be discussed in further detail below.

The impeller baffle 40 is integrally formed with the annular collar 42 and includes a generally annular body with a front baffle face 48, a rear baffle face 50 and a central baffle opening 52. Illustratively, a rounded bevel edge 54 joins the annular collar 42 to the rear baffle face 50, although other transition structures may be contemplated as well. When the bearing housing cover 38 is mounted to the bearing housing 30, the front baffle face 48 is positioned adjacent the impeller rear face 28. As such, the air pressure leaving the impeller 24 drops as it approaches the centerline of the engine 10, i.e. axis 11, and enters the bearing housing 30. This aids in sealing the bearing housing 30 and/or provides a cooling flow F within the bearing housing 30, as will be discussed in further detail below. In some cases, the impeller baffle 40 may be manufactured to have a complex profile shape based on the engine's 10 particular air system requirements. For instance, the front baffle face 48 may have a profile that follows that of the impeller rear face 28. Other shapes or profiles for the impeller baffle 40 may be contemplated as well.

A plurality of stiffening elements 56 extend between the rear baffle face 50 and the annular collar 42. The stiffening elements 56, also referred to as reinforcement elements, may be integral with the bearing housing cover 38, i.e. formed from a single piece. In other cases, additional add-on or mountable reinforcement elements may be contemplated as well. In the embodiment shown in FIG. 3B, these stiffening elements 56 are in the form of webs. Other types of stiffening elements may be contemplated as well, as will be discussed in further detail below. As shown, the web base 56a provides support for the web 56 at the rear baffle face 50. The web body 56b is shown to be thinner than the web base 56a and slightly curved, although other shapes and sizes may be contemplated as well. The web end 56c where the web 56 meets the annular collar 42 is reinforced for added support. The number, thickness and spacing of the stiffening elements 56, illustratively the webs 56, may vary, for instance based on the structural requirements of the engine 10. For instance, while the webs 56 shown in FIG. 3B are spaced equally from one another, in other cases the spacing between the webs 56 (or other stiffening elements) may vary along the circumference of the bearing housing cover 38. In addition, various parameters of the stiffening elements 56 can be adjusted to vary or tune the dynamic response of the impeller baffle 40 to reduce vibrations, as will be discussed in further detail below.

Still referring to FIGS. 3A and 3B, in at least the depicted embodiment a plurality of air passages 58 extend through the bearing housing cover 38. In the shown case, the bearing housing cover 38 includes six air passages 58, five of which are visible in FIG. 3A. Three of the six air passages 58 illustratively extend at least partially axially through the annular collar 42 between air inlets 58a disposed on the front baffle face 48 and air outlets 58b disposed on the flange 44. The remaining three air passages 58 (two of which are visible in FIG. 3A) have air inlets 58a within the annular collar 42 and outlets 58b disposed on the flange 44. As can be seen in FIG. 3B, the six air outlets 58b are disposed on the flange 44. Other numbers and pathways for the air passages 58 may be contemplated as well. As will be discussed in further detail below, the air passages 58 may divert a portion of the airflow F from the impeller rear face 28 to the bearing housing 30 and/or to components downstream of the bearing housing 30 for various engine cooling and sealing requirements. In the shown case, the number of inlets 58a corresponds to the number of outlets 58b. In the shown case, the inlets 58a and outlets 58b are slot-like openings disposed about the circumference of the central baffle opening on the front baffle face 48, within the annular collar 42 or on the flange 44. Other shapes, positions and sizes of inlets 58a and/or outlets 58b may be contemplated as well, for instance based on the airflow and/or sealing requirements of the various components of the bearing housing 30.

As can be seen in FIG. 2, the bearing housing cover 38 is mountable to the bearing housing 30 at an upstream end thereof. The bearing housing cover 38 may also be referred to as the front bearing housing cover 38, while a rear bearing housing cover 60 is mountable to a downstream end of the bearing housing 30. A plurality of bolts 62 or other like fasteners may be used to fasten the bearing housing covers 38, 60 to the bearing housing 30. Illustratively, each bolt 62 may pass through a bolt hole 46 on the flange 44 of the front bearing housing cover 38, through a bore 64 in the bearing housing 30 and then through a corresponding bolt hole (not shown) in the rear bearing housing cover 60. In some cases, the bolt holes 46 in front bearing housing cover 38 and/or the bolt holes in the rear bearing housing cover 60 may be threaded for secure attachment. In some cases, the bore 64 may be threaded as well. Other forms of attachment may be contemplated as well.

The rear bearing housing cover 60 includes a plurality of air passages 66. When the bearing housing covers 38, 60 are mounted to the bearing housing 30, air passageways in fluid communication with the air passages 58, 66, for instances the bores 64, allow airflow F to flow between air passages 58 in the front bearing housing cover 38 and the air passages 66 in the rear bearing housing cover 60. For instance, air may pass through hollow portions of the bolts 62 themselves, and/or around the bolts 62 within the bores 64. As discussed above, the airflow F can be diverted to various components downstream of the bearing housing 30 for cooling and/or sealing purposes. The dimensions of the air passages 58, 66 may vary, for instance based on the cooling and/or sealing needs of these various components.

As shown in FIGS. 2 and 3A to 3B, the bearing housing cover 38 further includes an inner ring 68 and a lip 70 to control the incoming air entering the bearing housing 30. The width of the inner ring 68 may vary to alter the size of the central baffle opening 52, for instance in response to engine requirements for temperature and pressure gradients. When installed, the lip 70 extends radially inwardly into close proximity with an outer surface of a runner 72 supporting the front carbon seal 34 to thus define a narrow air gap 74 through which the airflow F may enter the bearing housing 30. The inner diameter of the lip 70 may be coated for a labyrinth seal with the runner 72. In some cases, the airflow F entering through the narrow gap 74 may aid in sealing the front carbon seal 34. The downstream end of the bearing housing 30 may similarly include a narrow air gap 74 formed by an outer surface of a runner 72 Airflow F may thus be provided to the downstream end of the bearing housing 30, for instance to aid in sealing the rear carbon seal 36. This airflow F may be diverted from the exit of the air passages in the rear bearing housing cover 60, although other airflow sources may be contemplated as well.

In different cases, the thickness of the baffle 40, i.e. between the front baffle face 48 and the rear baffle face 50, can vary. For instance, larger engines with different dynamic responses may require a thicker baffle 40 to ensure structural integrity. Alternatively, in smaller engines, a thinner baffle 40 may be used to reduce the overall weight of the engine 10. In certain cases, the thickness of baffle 40 may vary, for instance in radial or circumferential directions. For instance, the baffle 40 may be thinner at the circumferential positions where the stiffening elements 56 meet the rear baffle face 50. In addition, the baffle 40 may be thicker at other circumferential positions to provide additional structure where necessary. Alternatively, the baffle 40 may be thicker towards the central baffle opening 52 and become thinner towards the radial outer edge of the baffle 40. The reverse configuration may be contemplated as well. The thickness of the baffle 40 may also vary based on the dynamic tuning requirements of the baffle 40, as will be discussed in further detail below.

Referring to FIG. 4, the stiffening elements 56' may have shapes or sizes that vary from one to the other. Illustratively, each alternating web 56' terminates at a different height on the annular collar 42, alternating between reaching midway up the annular collar 42 and reaching a point just below the flange 44. Such variations in height may, for instance, aid in reducing the weight of the bearing housing cover 38, provide additional rigidity in strategic locations, and/or aid in dynamically tuning the baffle 40. In addition, the webs 56' shown in FIG. 4 are thicker than those in FIG. 3B, for instance for added strength.

Referring to FIG. 5, in the shown case the stiffening elements 56" are in the form of ribs 56" extending from the rear baffle face 50 to the annular collar 42. The number, spacing and thickness of the ribs 56" may vary, for instance based on structural and/or weight requirements. The positioning of the ends of the ribs 56" on the rear baffle face 50 and/or on the annular collar 42 may vary as well. In some cases, the ribs 56" may be hollow, for instance to save weight, while in other cases they may be solid for added rigidity. Combinations of hollow and solid ribs 56", for instance in alternating order, may be contemplated as well. Alternative or additional structural features may be contemplated as well, for instance struts, dimples and/or lightening holes. Such features may contribute towards increasing the structural rigidity and/or reducing the weight of the bearing housing cover 38, as well as aiding in dynamically tuning the baffle 40.

As discussed above, the bearing housing cover 38 with the integrated impeller baffle 40 is manufactured or otherwise formed from a single piece of material. Various manufacturing techniques may be contemplated, such as machining from a solid material, casting, or other suitable techniques. Compared to traditional non-integrated impeller baffles, there are fewer required manufacturing steps, as the baffle does not need to be stamped and then welded or brazed to the bearing housing. In addition, the part tolerances between the baffle 40 and bearing housing cover 38 may be improved relative to non-integrated impeller baffles as the two parts are integrated. As there are fewer welding and/or brazing joints that could potentially fail, the risk of loose hardware may be lowered with the integrated baffle 40 design. The herein described impeller baffle 40 may be easier to mount or assemble to the bearing housing than non-integrated baffles due to its integration in the bearing housing cover 38, and the reduced part count may reduce the required assembly time.

As discussed above, the integrated impeller baffle 40 of the bearing housing cover 38 may be dynamically tuned. As the baffle's 40 natural frequencies are typically within running range of the engine 10, such dynamic tuning may be done to prevent undesirable vibrations. As the bearing housing cover 38 with the integrated impeller baffle 40 is manufactured from a single part, there may be an opportunity during the design process to tune the baffle's 40 dynamic response to avoid unwanted natural frequencies. As discussed above, such tuning may be done by optimizing the stiffening elements 56, for instance by altering the type, spacing, and number of stiffening elements 56. Such tuning may also be done by varying the thickness of the baffle 40. Other dynamic tuning methods may be contemplated as well.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A bearing housing cover for a gas turbine engine having an impeller, comprising:
    an annular collar having a flange mountable to an exterior surface of a bearing housing;
    an impeller baffle integrated with the annular collar, the impeller baffle having an annular body with a front baffle face positionable adjacent a rear face of the impeller, a rear baffle face having a plurality of stiffening elements extending between the rear baffle face and the annular collar, and a central baffle opening; and
    a plurality of air passages extending through the bearing housing cover at least partially axially between the front baffle face and the flange, the plurality of air passages being circumferentially separated from one another, and wherein, upon mounting the flange to the exterior surface of the bearing housing, the plurality of air passages are in fluid communication with air passageways through the bearing housing.

2. The bearing housing cover as defined in claim 1, wherein the front baffle face is shaped to follow the profile of the rear face of the impeller.

3. The bearing housing cover as defined in claim 1, wherein the plurality of stiffening elements include one or more of ribs, webs or struts.

4. The bearing housing cover as defined in claim 1, wherein the plurality of stiffening elements are hollow.

5. The bearing housing cover as defined in claim 1, wherein the plurality of stiffening elements are evenly spaced about the circumference of the annular collar.

6. The bearing housing cover as defined in claim 1, wherein the baffle includes a varying thickness between the front baffle face and the rear baffle face.

7. The bearing housing as defined in claim 6, wherein the thickness of the baffle varies in a radial or circumferential direction.

8. The bearing housing as defined in claim 1, wherein, upon mounting the flange to the exterior surface of the bearing housing, the plurality of air passages are in fluid communication with an interior chamber of the bearing housing.

9. The bearing housing as defined in claim 1, wherein the flange includes a plurality of bolt holes for mounting to the exterior surface of the bearing housing.

10. A gas turbine engine comprising:
a centrifugal compressor having an impeller;
a bearing housing located downstream from the impeller, the bearing housing including a bearing within an interior chamber, the bearing rotationally supporting the impeller; and
a bearing housing cover at least partially enclosing the bearing housing, the bearing housing comprising:
an annular collar having a flange mountable to an exterior surface of the bearing housing;
an impeller baffle integrated with the annular collar, the impeller baffle having an annular body with a front baffle face positioned adjacent a rear face of the impeller, a rear baffle face having a plurality of stiffening elements extending between the rear baffle face and the annular collar, and a central baffle opening; and
a plurality of air passages circumferentially separated from one another and extending through the bearing housing cover at least partially axially between the front baffle face and the flange, the plurality of air passages in fluid communication with the interior chamber of the bearing housing.

11. The gas turbine engine as defined in claim 10, wherein the bearing housing cover is mounted to an upstream end of the bearing housing.

12. The gas turbine engine as defined in claim 11, further comprising a second bearing housing cover mounted to a downstream end of the bearing housing, the second bearing housing cover including a plurality of air passages in fluid communication with the plurality of air passages in the bearing housing cover mounted to the upstream end of the bearing housing.

13. The gas turbine engine as defined in claim 10, wherein the central baffle opening in the bearing housing cover includes an inner ring having a lip extending radially inwardly adjacent an outer surface of the bearing housing to define an air gap leading to the interior chamber of the bearing housing.

14. The gas turbine engine as defined in claim 10, wherein the front baffle face is shaped to follow the profile of the rear face of the impeller.

15. The gas turbine engine as defined in claim 10, wherein the plurality of stiffening elements include one or more of ribs, webs or struts.

16. The gas turbine engine as defined in claim 10, wherein the plurality of stiffening elements are hollow.

17. The gas turbine engine as defined in claim 10, wherein the plurality of stiffening elements are evenly spaced out about the circumference of the annular collar.

18. The gas turbine engine as defined in claim 10, wherein the baffle includes a varying thickness between the front bearing face and the rear bearing face.

19. The gas turbine engine as defined in claim 18, wherein the thickness of the baffle varies in a radial or circumferential direction.

20. A gas turbine engine comprising:
a centrifugal compressor having an impeller;
a bearing housing located downstream from the impeller, the bearing housing including a bearing within an interior chamber, the bearing rotationally supporting the impeller;
a bearing housing cover at least partially enclosing the bearing housing, the bearing housing comprising:
an annular collar having a flange mountable to an exterior surface of the bearing housing;
an impeller baffle integrated with the annular collar, the impeller baffle having an annular body with a front baffle face positioned adjacent a rear face of the impeller, a rear baffle face having a plurality of stiffening elements extending between the rear baffle face and the annular collar, and a central baffle opening; and
a plurality of air passages extending at least partially axially between the front baffle face and the flange, the plurality of air passages in fluid communication with the interior chamber of the bearing housing;
wherein the bearing housing cover is mounted to an upstream end of the bearing housing; and
a second bearing housing cover mounted to a downstream end of the bearing housing, the second bearing housing cover including a plurality of additional air passages in fluid communication with the plurality of air passages in the bearing housing cover mounted to the upstream end of the bearing housing.

* * * * *